(12) United States Patent
Bazzo et al.

(10) Patent No.: US 9,738,016 B2
(45) Date of Patent: Aug. 22, 2017

(54) METHOD OF INJECTION MOLDING OF PLASTIC MATERIALS

(71) Applicant: INGLASS S.p.A., San Polo di Piave (Treviso) (IT)

(72) Inventors: Maurizio Bazzo, San Polo di Piave (IT); Enzo De Seta, San Polo di Piave (IT)

(73) Assignee: INGLASS S.p.A., San Polo di Piave (Treviso) (IT)

( * ) Notice: Subject to any disclaimer, the term of this patent is extended or adjusted under 35 U.S.C. 154(b) by 184 days.

(21) Appl. No.: 14/659,709

(22) Filed: Mar. 17, 2015

(65) Prior Publication Data

US 2015/0266216 A1    Sep. 24, 2015

(30) Foreign Application Priority Data

Mar. 18, 2014    (IT) .............................. TO2014A0216

(51) Int. Cl.
  *B29C 45/23* (2006.01)
  *B29C 45/00* (2006.01)
  *B29C 45/28* (2006.01)

(52) U.S. Cl.
  CPC ........ *B29C 45/0046* (2013.01); *B29C 45/281* (2013.01); *B29C 2045/0051* (2013.01); *B29C 2045/2872* (2013.01)

(58) Field of Classification Search
  CPC .... B29C 2045/0051; B29C 2045/2872; B29C 45/0046; B29C 45/281
  See application file for complete search history.

(56) References Cited

U.S. PATENT DOCUMENTS

| | | | | | |
|---|---|---|---|---|---|
| 5,556,582 | A | * | 9/1996 | Kazmer | .............. B29C 45/0025 264/328.12 |
| 6,228,309 | B1 | * | 5/2001 | Jones | .................. B29C 45/2806 264/328.8 |
| 6,632,079 | B1 | * | 10/2003 | Kazmer | .............. B29C 45/2701 425/145 |

(Continued)

FOREIGN PATENT DOCUMENTS

| | | |
|---|---|---|
| JP | S60212321 A | 10/1985 |
| JP | 2007144662 A | 6/2007 |

(Continued)

OTHER PUBLICATIONS

Italian Search Report and Written Opinion for Italian Application No. ITTO20140216 mailed Dec. 8, 2014.

(Continued)

*Primary Examiner* — Jill Heitbrink
(74) *Attorney, Agent, or Firm* — RMCK Law Group, PLC

(57) ABSTRACT

A method of injection molding of plastic materials into a cavity of a mold with a molding apparatus including a distributor of the pressurized fluid plastic material connected to at least one injector having a pin valve displaceable between a fully closed position and an open position. The method includes a filling step following displacement of the pin valve from the fully closed position to the open position, a packing step of the pressurized plastic material keeping the pin valve in the open position, and a step of displacement and maintenance of the pin valve in at least one partially closed intermediate position prior to its complete closure.

8 Claims, 3 Drawing Sheets

(56) References Cited

U.S. PATENT DOCUMENTS

| | | | |
|---|---|---|---|
| 8,641,943 B1* | 2/2014 | Kipe | B29C 45/77 264/328.8 |
| 2009/0179350 A1* | 7/2009 | Bader | B29C 45/76 264/328.8 |
| 2010/0225025 A1* | 9/2010 | Striegel | B29C 45/0025 264/328.8 |
| 2012/0248644 A1* | 10/2012 | de Oliveira Antunes | B29C 45/2703 264/40.5 |
| 2014/0046465 A1* | 2/2014 | de Oliveira Antunes | B29C 45/76 700/97 |

FOREIGN PATENT DOCUMENTS

| | | |
|---|---|---|
| JP | 2008221472 A | 9/2008 |
| WO | 03/057448 | 7/2003 |
| WO | 2014031826 | 2/2014 |

OTHER PUBLICATIONS

"Flexflow", Oct. 15, 2013, XP054975575, Retrieved from the Internet: URL:http://youtube.com/watch?v=G2-cv79Hpeg Retrieved Oct. 27, 2014.

Office Action dated Mar. 14, 2017, for corresponding Japanese Application 2015-049799, including English translation.

* cited by examiner

METHOD OF INJECTION MOLDING OF PLASTIC MATERIALS

CROSS REFERENCE TO RELATED APPLICATIONS

This application claims priority to Italian Patent Application No. TO2014A000216 filed on Mar. 18, 2014, the entire disclosure of which is incorporated herein by reference.

FIELD OF THE INVENTION

The present invention relates to a method of injection molding of plastic materials into the cavity of a mold, by means of a molding apparatus comprising a distributor of the pressurized fluid plastic material, connected to at least one injector comprising a pin valve displaceable between a fully closed position and an open position.

Typically, these injection molding methods comprise a filling step of the mold cavity with the plastic material following displacement of the pin valve from the fully closed position to the open position, followed by a packing step for injection of the pressurized plastic material into the cavity, in which the pin valve is kept in the open position. The pin valve is then displaced from the open position to the fully closed position and, after a waiting time to allow the plastic material to solidify, the molded article is extracted from the mold.

STATE OF THE PRIOR ART

For injection molding of articles for which a high quality is required, both regarding the mechanical profile and from an aesthetic point of view such as, for example, in the case of particularly large motor vehicle components, the molding apparatus usually uses a certain number of injectors distributed in different zones of the mold. In the case where these injectors are fed by a single distributor, typically positioned at the central zone of the mold cavity, significant differences can be generated in the pressure and density of the plastic material injected between the zones of the cavity next to the central injector(s) or first injectors, and those corresponding to the peripheral injector(s) or second injectors. For this reason, in these cases a cascade injection is utilized, in which the filling step of the mold cavity is carried out by sequentially commanding the opening of the pin valves of different injectors so as to progressively fill the mold cavity from the central zone towards the peripheral zones, or rather by opening the first injectors and then the second injectors. In this case, the pin valves of the first injectors can remain open during the entire injection cycle, or can be displaced to the closed position, sequentially to the opening of the pin valves of the second injectors. In this way, advancing of the filling front of the mold cavity is improved and the local pressure caused by accumulation of the plastic material in the initially-filled zones of the cavity is reduced.

Particularly in the case of this type of sequential injection, the packing step that follows the filling step must be balanced between the various injectors and the different zones of the cavity, as some could receive a greater amount of plastic material and others less. Any imbalances and overpacking generally cause distortion problems of the molded piece, tensionings with consequent reduction of the mechanical properties, localized increases in thickness, and in some cases filaments and breakages during the molding step.

Similar problems, albeit minor, can also occur in the injection molding of articles whose dimensions do not necessarily require a sequential methodology.

SUMMARY OF THE INVENTION

The object of the invention is to resolve the problem of overpacking, reducing the flow and the pressure of the injected plastic material where it is expected that this problem may manifest itself.

According to the invention, this object is achieved thanks to an injection molding method of the type defined in the preamble of claim 1, whose unique characteristic lies in the fact that it includes an additional step of displacement and maintenance of the pin valve of the aforesaid at least one injector in at least one intermediate position of partial closure.

This additional step of partial closure can be implemented towards the end of the filling step, or during the packing step, or even between the filling step and the packing step.

Thanks to this solution idea, it is possible, particularly though not exclusively in the case of sequential injection, to optimally balance the pressures and distributions of the plastic material within the mold cavity.

There can be one or several positions of partial closure of the pin valve, and it can be implemented as a function of the time lapsed from the beginning of the filling step, or as a function of the volume of injected plastic material from the beginning of the filling step. Typically, the stroke of the pin valve between the position of partial closure and the fully closed position can be between 0.1 and 5 mm.

BRIEF DESCRIPTION OF THE DRAWINGS

The invention will now be described in detail with reference to the attached drawings, provided purely by way of non-limiting example, in which.

DETAILED DESCRIPTION OF THE INVENTION

Figure 1:
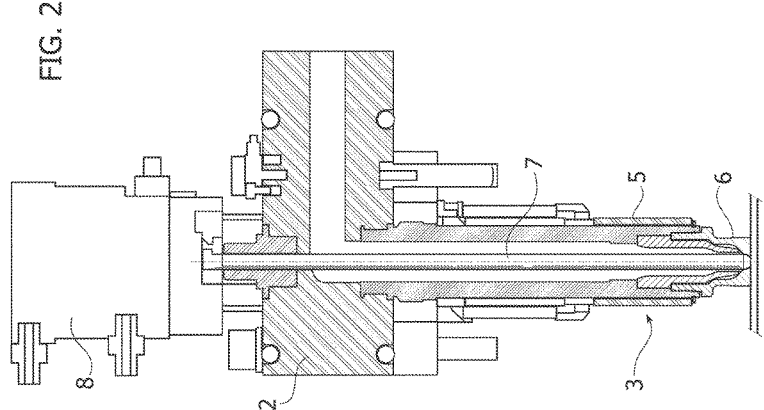
FIG. 1 shows an example of an article of molded plastic material whose molding method is implemented according to the invention, with an apparatus represented basically in this figure.

FIG. 1 represents an article of molded plastic material, for which the method according to the invention is particularly advantageous: it is a bumper P for motor vehicles, which has characteristics of large dimensions (length of 1200-1500 mm) relative to the thickness (2-3 mm), average-high weight (generally higher than 1200-1500 g), high aesthetic value due to its visible position on the car, and the need for any subsequent processing such as painting that, to obtain an excellent aesthetic result, requires a good quality plastic support without surface defects of an aesthetic nature and without localized defects of a chemical/physical nature of the plastic material caused by transformation during the molding method. Other articles whereby the method according to the invention is effective may consist, for example, still referring to the automotive field, of panels made of very technical and viscous plastic materials, such as polycarbonate or polymethyl-methacrylate, whereby the injection pressures reach very high values.

Still with reference to FIG. 1, an injection molding apparatus is schematized, normally used for producing the article P: a plasticizing unit 1 transforms the plastic material and injects it into the mold cavity, not shown, through a single hot runner distribution system 2 via a plurality of injectors 3, 4 connected thereto. The injectors 3 are positioned at generally central injection passages of the mold, while the injectors 4 are placed at peripheral injection passages.

Figure 2:
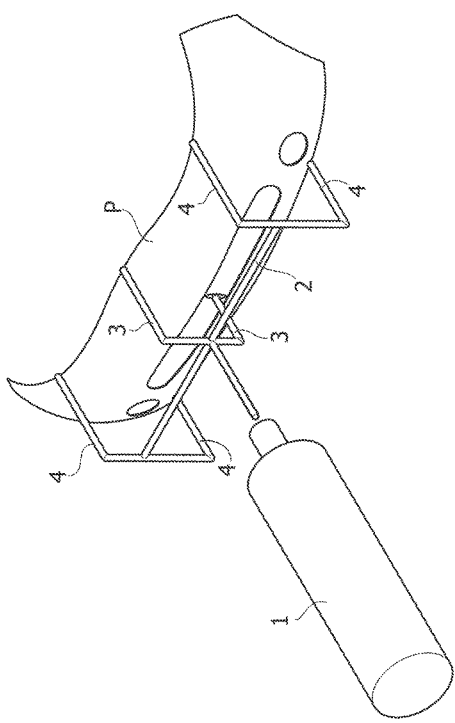
FIG. 2 is a partial cross-sectional view showing a detail of the molding apparatus.
Figure 3:
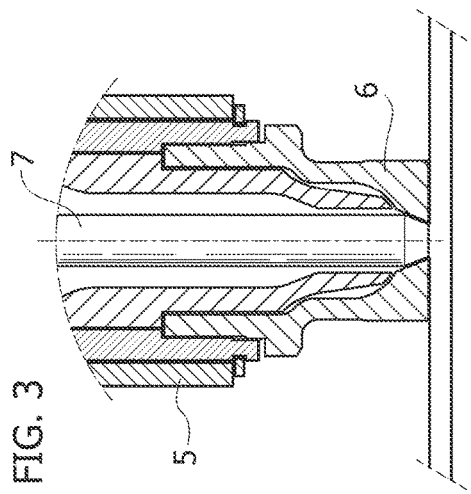
FIGS. 3, 4, 5 and 6 are views on an enlarged scale of a detail of FIG. 2 during respective successive steps of the molding method, and FIGS. 7-8, 9-10 and 11-12 exemplify, with reference to the article of FIG. 1, the effects resulting from the method according to the invention.
Figure 4:
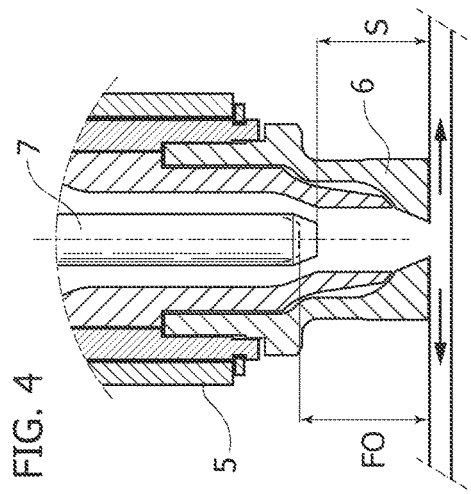
Figure 6:
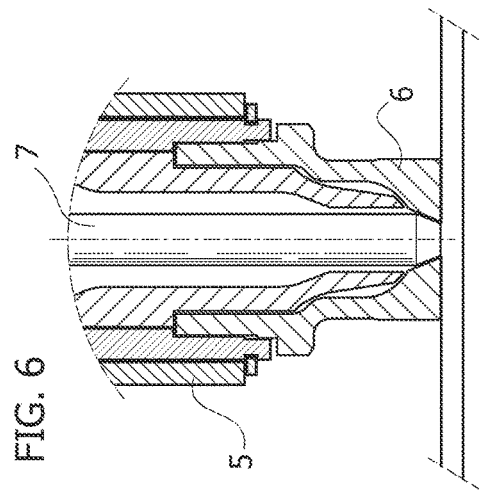

FIG. 2 illustrates one of the injectors 3 (or 4) connected to the hot chamber 2, in a less schematic form: it comprises, in a wholly conventional manner, a nozzle 5 provided at its free end with a nozzle terminal 6 whose opening and closing are controlled by a pin valve 7 axially displaceable along the nozzle 5 by means of a fluid or electrical actuator 8, between a fully closed position, shown in FIGS. 3 and 6, and a fully open position shown in FIG. 4.

Typically, the molding cycle operated through each injector 3, 4 involves, starting from the fully closed position of the pin valve 7 (FIG. 3), opening of this pin valve 7 (FIG. 4) to allow the flow of plastic material from the hot chamber 2 into the mold cavity, during a filling step.

The opening can be complete, as indicated by the height FO in FIG. 4, or almost complete as indicated by the height S.

During this step, the pressure of the injected plastic material is increasing and the mold cavity is filled to 95-99%, with a possible control of the speed/flow rate of the plastic material.

The filling step is followed by a maintenance or packing step, where the pin valve 7 is kept in the fully or almost fully open position to balance the filling, and the injected plastic material is kept pressurized for a short lapse of time (usually 5-10 seconds), possibly following a predetermined pressure profile. This step serves to compensate for the natural shrinkage of the plastic material from the fluid state to the solid state (0.5-1%), and to ensure that each zone of the molded component cools down with a sufficient pressure in the core still in the molten state.

Figure 7:
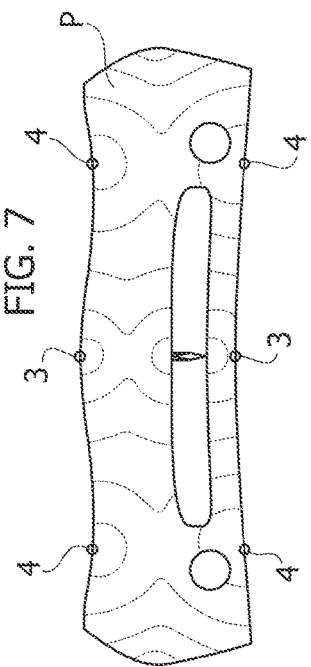

The zones of the injected material close to the injection points have a greater pressure at the core, while the pressure is lower at the zones more distant from the injection points. Furthermore, there is also a pressure difference between the zones close to the injection points which may possibly remain open longer than others, or zones that are closer to the center of the hot chamber 2. The zones with greater compression will be "overpacked", or rather will present a greater local density and will have lower volumetric shrinkage, therefore entailing deformations of the molded article. Conversely, the zones that are not packed enough will have lower densities and higher shrinkage, and will therefore tend to contract the article, also in this case deforming it. These two situations are illustrated, respectively, in FIGS. 7-8 and 9-10: FIGS. 7 and 9 show the front of the article P with a qualitative representation of the variation in density of the injected plastic material, in the open condition of all the injectors 3, 4 and in the condition in which the central injectors 3 are fully closed, respectively.

Figure 8:
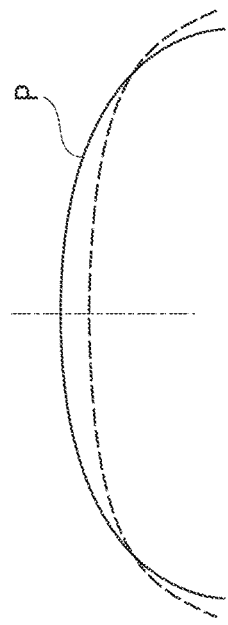
Figure 10:
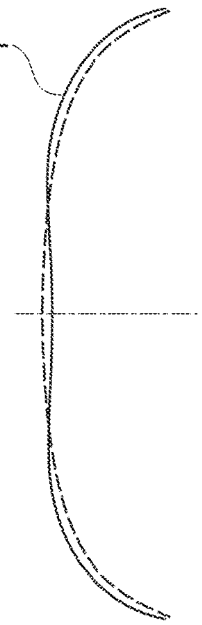
Figure 9:
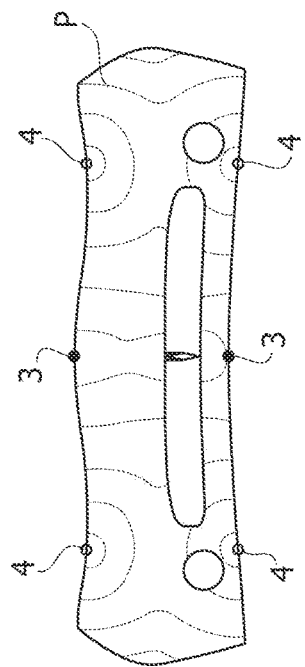

FIGS. 8 and 9 schematize the article P in top plan view, highlighting the deformation with a continuous line, compared to the theoretical profile represented by a dashed line. In the first case (FIG. 8), the article P has a more pronounced curvature in its central part, due to the overpacking of the plastic material in that zone, and a less pronounced curvature at the ends due to a lower packing. In the second case (FIG. 10), the central zone of the article P even has a concavity due to insufficient packing.

Figure 5:
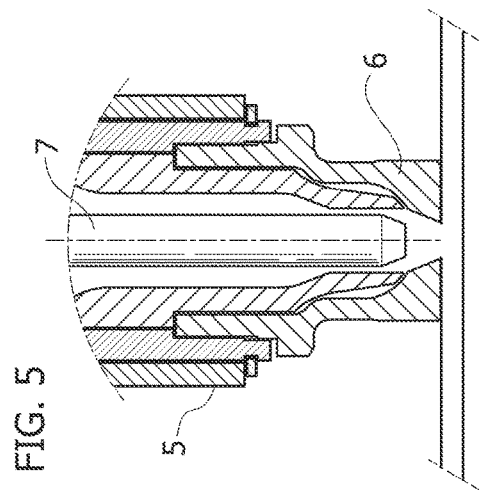
Figure 12:
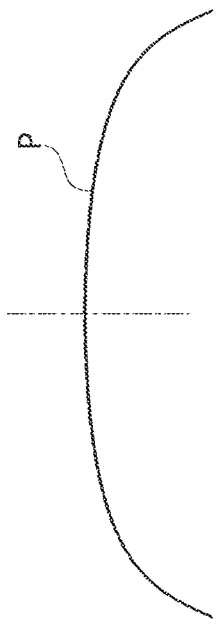
Figure 11:
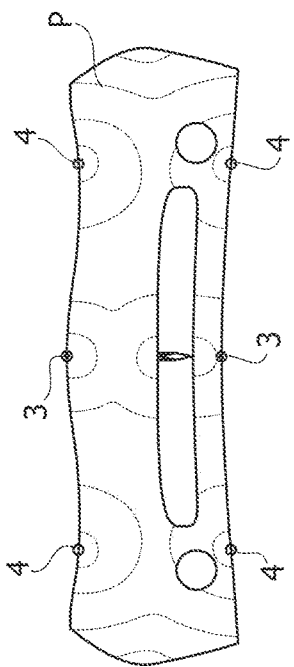

FIGS. 11 and 12 represent, in the same graphic form of FIGS. 7-8 and 9-10, the situation corresponding to the unique characteristic of the molding method according to the invention: towards the end of the filling step, or between the filling step and the packing step, or even during the packing step, the pin valves 7 of the injectors 3 corresponding to the central zone of the article P are displaced from the open position of FIG. 4 to a position of partial closure, represented in FIG. 5. In this step, in which the pin valves 7 of the injectors 3 are maintained in the position of partial closure, the pin valves 7 of the peripheral injectors 4 remain in the total or partial open position, according to the balancing of the pressures in the different zones of the mold cavity.

In this intermediate position of partial closure, which can be single or multiple in the sense that the pin valve 7 can be subsequently moved into positions of partial closure gradually closer to that of complete closure, the pressure upstream of the nozzle terminal 6 is greater than the downstream pressure, that is, greater than the pressure within the corresponding zone of the mold cavity. This pressure difference determines a lower local density of the injected plastic material in these zones of the mold cavity, with elimination of overpacking. In other words, the half-closed intermediate position of the pin valve 7 which precedes its complete reclosure (represented in FIG. 6 and corresponding to the end of the injection cycle) allows better balancing of the pressures and distributions of the material within the cavity, so that the pressures and densities of the plastic material within the mold cavity are more uniform. In this way, the piece P molded at the end of the process has (FIG. 12) a conformation essentially corresponding to the theoretical design.

It should be noted that the additional step of displacement and maintenance of the pin valve 7 in the intermediate position(s) of partial closure can be implemented, typically by means of an electronic control unit not shown, and operatively connected to the actuator 8, as a function of the time lapsed from the beginning of the filling step and/or as a function of the volume of injected plastic material from the beginning of the filling step.

By way of example, the distance of the end of the pin valve 7 from the position of partial closure in FIG. 5 to the fully closed position in FIG. 6 may be between 0.1 and 5 mm.

To improve and facilitate the settings of the parameters and of the closing strokes of the pin valves, pressure sensors (not illustrated since they are within the scope of those skilled in the art) can be conveniently installed in the mold cavity, at points next to and also distant from the injection points, to detect and therefore balance, by means of the electronic control unit, the pressure trends. Alternatively, the best molding conditions can be identified with the help of a measured template configured to quantify local deviations from the theoretical form.

It should be noted that although the invention has been described with reference to a sequential molding method, it can also be advantageously applied to non-sequential injection molding processes, allowing in any case the production of articles having improved mechanical properties and aesthetic qualities.

The invention claimed is:
1. A method of injection molding of plastic materials into a mold cavity with a distributor of pressurized fluid plastic material connected to at least one injector comprising a pin valve displaceable between a fully closed position and an open position, the method comprising a filling step of said mold cavity with the pressurized plastic material following displacement of the pin valve from the fully closed position to the open position, a packing step of the pressurized plastic material within the mold cavity while the pin valve is kept in the open position, directly followed by an additional step of displacement of the pin valve from the open position directly to and kept in a single partially closed intermediate position, and then directly followed by displacement of the pin valve from the single partially closed intermediate position to the fully closed position, the method further comprising an absence of reopening the pin valve subsequent to displacement of the pin valve to the single partially closed intermediate position during an injection cycle; wherein a plurality of first and second injectors are arranged at a generally central zone and of one or more generally peripheral zones of the mold cavity, respectively, and wherein the filling step is performed by sequentially controlling said first and second injectors so that the pin valves of the first injectors are displaced from the fully closed position to the open position prior to the pin valves of the second injectors whereby the mold cavity is progressively filled from said generally central zone towards said one or more generally peripheral zones, and wherein said additional step is carried out only for the pin valves of the first injectors such that the pin valves of the second injectors remain in the open position during said additional step.

2. The injection molding method according to claim 1, wherein said additional step is carried out during the packing step.

3. The injection molding method according to claim 1, wherein said additional step is carried out towards an end of the filling step.

4. The injection molding method according to claim 1, wherein said additional step is carried out between the filling step and the packing step.

5. The injection molding method according to claim 1, wherein said additional step is carried out as a function of time lapsed from a beginning of the filling step.

6. The injection molding method according to claim 4, wherein said additional step is carried out as a function of a volume of plastic material injected from a beginning of the filling step.

7. The injection molding method according to claim 1, wherein a distance between said at least one intermediate position and the fully closed position of the pin valve is between 0.1 and 5 mm.

8. The injection molding method according to claim 1, wherein displacement of the pin valve is controlled through detection of pressures within the mold cavity.

* * * * *